(12) United States Patent
Gödtner

(10) Patent No.: US 6,655,249 B1
(45) Date of Patent: Dec. 2, 2003

(54) HAMMER (TOOL MACHINE), SPECIFICALLY INTENDED FOR IMPACT CUTTERS FOR CUTTING SECTIONS OF WIRE AND/OR RODS

(75) Inventor: Werner Gödtner, Reutlingen/Württ. (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 0 days.

(21) Appl. No.: 09/494,994

(22) Filed: Jan. 31, 2000

(51) Int. Cl.[7] ............................................. B23D 23/00
(52) U.S. Cl. ..................... 83/196; 83/601; 83/602; 173/49; 173/102; 173/100; 173/202; 173/203
(58) Field of Search ..................... 173/38, 95, 94, 173/112, 113, 121, 122, 211, 102, 96, 97, 49, 203, 202, 100; 83/196, 199, 601, 602

(56) References Cited

U.S. PATENT DOCUMENTS

| | | | | |
|---|---|---|---|---|
| 3,780,606 A | * | 12/1973 | Jentsch, Jr. et al. | 83/199 X |
| 4,343,208 A | * | 8/1982 | Basily et al. | 83/196 |
| 4,433,736 A | * | 2/1984 | Layotte et al. | 173/94 |
| 4,438,670 A | * | 3/1984 | Johnson | 83/199 X |
| 4,592,715 A | * | 6/1986 | Nebelung | 83/199 X |
| 4,635,514 A | * | 1/1987 | Borzym | 83/196 |
| 4,884,641 A | * | 12/1989 | Kendall | 173/94 |
| 5,065,653 A | * | 11/1991 | Werner | 83/199 |
| 5,156,073 A | * | 10/1992 | Zanzerl et al. | 83/196 X |
| 5,305,672 A | * | 4/1994 | Balint | 83/199 X |

FOREIGN PATENT DOCUMENTS

| | | |
|---|---|---|
| DE | 24 23 902 | 12/1974 |
| DE | 25 26 151 | 12/1976 |
| DE | 29 46 718 | 5/1981 |
| DE | 196 48 485 A 1 | 5/1998 |
| EP | 0 260 468 | 8/1987 |

* cited by examiner

*Primary Examiner*—Charles Goodman
(74) *Attorney, Agent, or Firm*—Renner, Otto, Boisselle & Sklar, LLP

(57) ABSTRACT

In order to avoid the recoil of the striker in a hammer device (tool machine) with a striker (18) that can be accelerated to strike velocity, and a tool carrier (14) receiving the impact of said striker, the invention proposes to arrange the striker (18) between the tool carrier (14) and a corresponding mass carrier (16) which moves together with the striker (18) until the striker (18) strikes the tool carrier (14), imparting its own momentum via the striker to the tool carrier, with a supplementary mass (56) on the mass carrier (16) providing the necessary striking energy.

17 Claims, 3 Drawing Sheets

HAMMER (TOOL MACHINE), SPECIFICALLY INTENDED FOR IMPACT CUTTERS FOR CUTTING SECTIONS OF WIRE AND/OR RODS

FIELD OF THE INVENTION

The object of the invention is a hammer (tool machine), in particular for recoilless high speed impact cutters for the cutting/shearing of wire and/or rod sections, generally for wire processing machines, in particular as part of single or multistage presses where the cutting cycle is integrated into the overall operation of the press.

BACKGROUND OF THE INVENTION

A device for cutting rod sections on automatic multistage crossfeed presses is known from DE 25 26 151 C3. Here, a striker (hammer) located at the end of a cam-guided striking lever indirectly strikes a sliding blade carrier. Upon the impact of the striker, the sliding blade carrier jumps forward with a high initial velocity (conservation of momentum). Then, coil springs return the sliding blade carrier back into contact with the striker so that the striker can move the sliding blade carrier to a transfer position where the rod section is picked up by a transport gripper.

This process has the disadvantage that the impact of the striker on the sliding blade carrier generates recoil which causes the striker to bounce off the sliding blade carrier; this, in turn, imposes a high stress on the cam gear driving the striker.

For this reason, the invention intends to solve the problem of avoiding the recoil caused by the impact of the striker on the sliding blade carrier, so that the cam gear is exposed only to a force with limited damaging effect.

SUMMARY OF THE INVENTION

The invention provides a machine tool hammer specifically intended for impact cutters for cutting sections of wire and/or rods. The tool includes a striker that can be driven back and forth at a selected impact speed, and a tool carrier on which the striker impacts. A separate mass carrier in the form of an auxiliary lever is located on the back side of the striker, facing away from the tool carrier. Starting at an initial position, the mass carrier stays in contact with the striker while following its movement towards the tool carrier until the striker strikes the tool carrier. At this point the movement of the mass carrier stops. The striker continues moving, driving the tool carrier from its starting position to cut the work piece. The striker then changes direction, allowing the tool carrier to return to its starting position, and thereafter taking the mass carrier back to its own starting position. The moving mass of the mass carrier is larger by the amount $2A/v^2$ than the moving mass of the tool carrier, where A is the work required to effect the cutting operation and v the operating speed to be provided by the tool carrier.

By causing the mass of the mass carrier to be moved by the striker, the cam-driven striker serves only as an intermediate buffer for the tool carrier, to which the momentum of the mass carrier is transferred in such manner that the momentum of the mass carrier and striker combined is equal to the momentum of tool carrier and striker combined.

BRIEF DESCRIPTION OF THE DRAWINGS

Below, the invention is explained in detail with the help of the design example shown schematically in the attached drawing.

DESCRIPTION OF THE INVENTION

Figure 1:
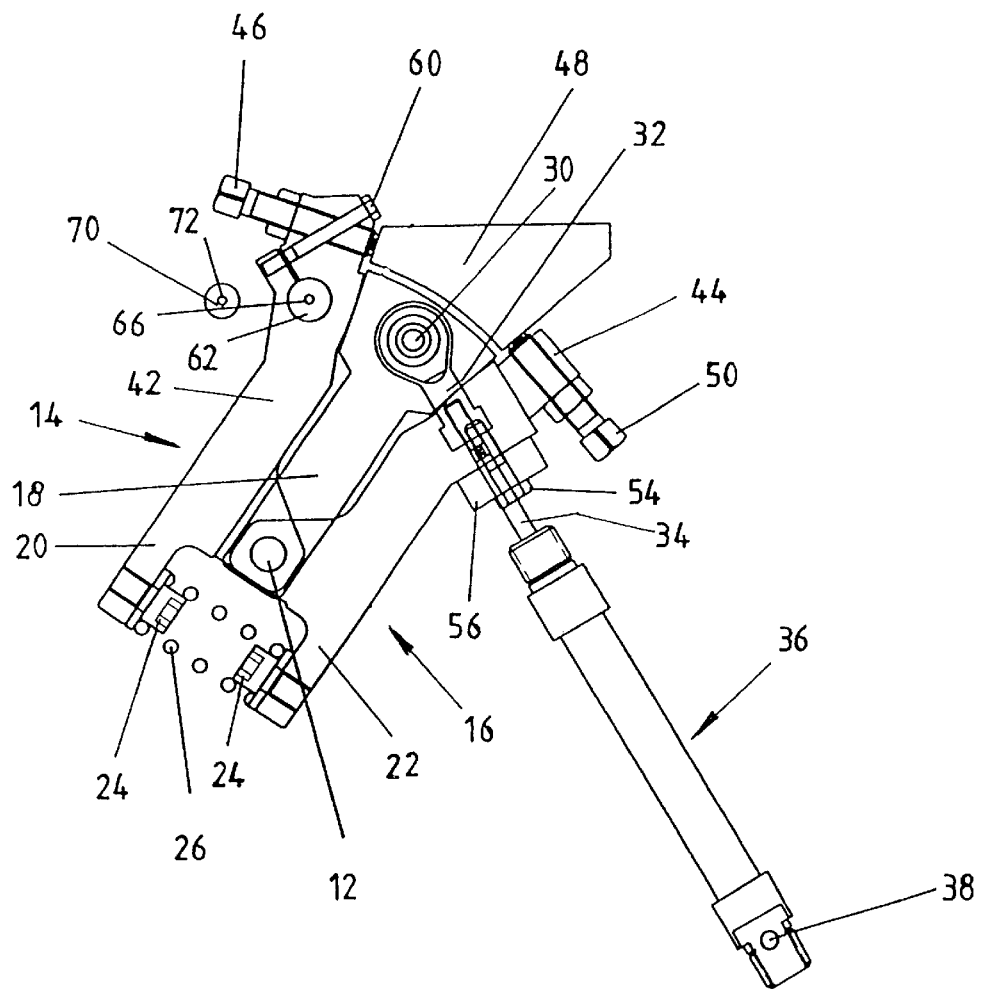
FIG. 1 shows a front view of an embodiment of the invention which, at the same time, also illustrates the starting position of the cutting movement.
Figure 2:
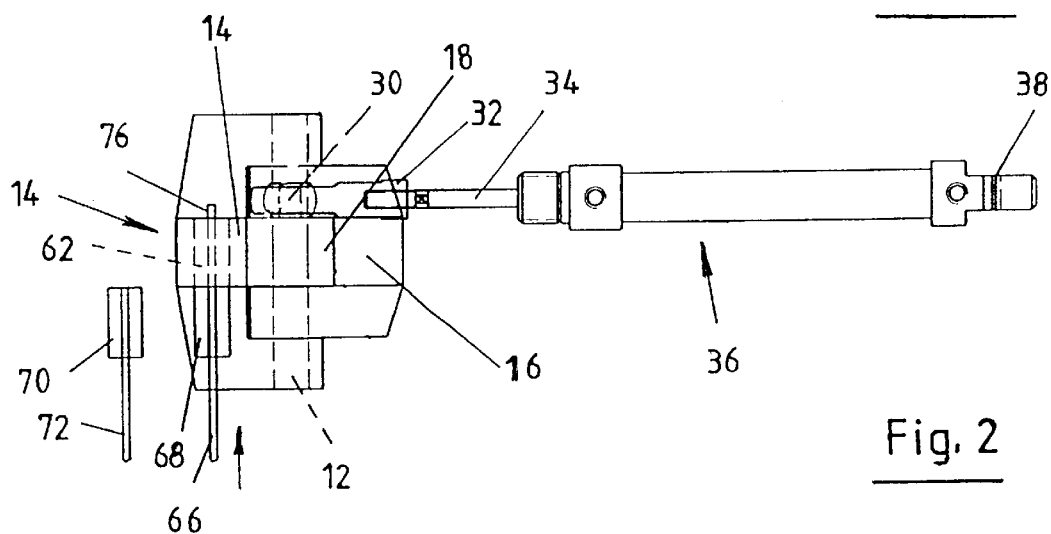
FIG. 2 shows a top view of the design shown in FIG. 1.

FIGS. 1 and 2 show a bolt 12 fixed in position in the frame of a single or multistage press, supporting a cutting lever 14, an auxiliary lever 16, and a striker 18 of a high speed cutter that is part of a forming press. A pretensioned compression spring 26 is installed on the spring pin 24 between the free ends of the short arms 20 and 22 of the two-armed levers 14 and 16. Via a pin 30, a joint 32 attached to the piston rod 34 of a cylinder-and-piston assembly 36 engages the striker 18. Via the pin 38, the cylinder-and-piston assembly 36 is attached to the frame of the forming press.

Via a set screw 46, the longer arm 42 of the cutting lever 14 contacts a counter bearing 48 that is attached to the machine frame. At the end of its longer arm 44, the auxiliary lever 16 also carries a set screw 50 which contacts the other side of the counter bearing 48, opposite the set screw 46.

By means of an attachment screw 54, a movable supplementary mass 56 which performs the cutting work is attached to the long lever arm 44 of the auxiliary. lever 16. A cutting sleeve 62 is attached to the long arm 42 of the cutting lever 14 by means of a clamping screw 60.

The position of the cutting lever 14 as shown in FIG. 1 permits the feeding of a wire 66 coming from a wire supply, through an additional cutting sleeve 68 that is installed in the frame in line with the cutting sleeve 62 in idle position, and into the cutting sleeve 62 located in the cutting lever 14 (FIG. 2).

Laterally adjacent to the cutting sleeve 68, shown on the left in FIGS. 1 and 2, an ejection sleeve 70 which guides an ejection ram 72 sliding on its inside is installed in the frame.

Figure 5:
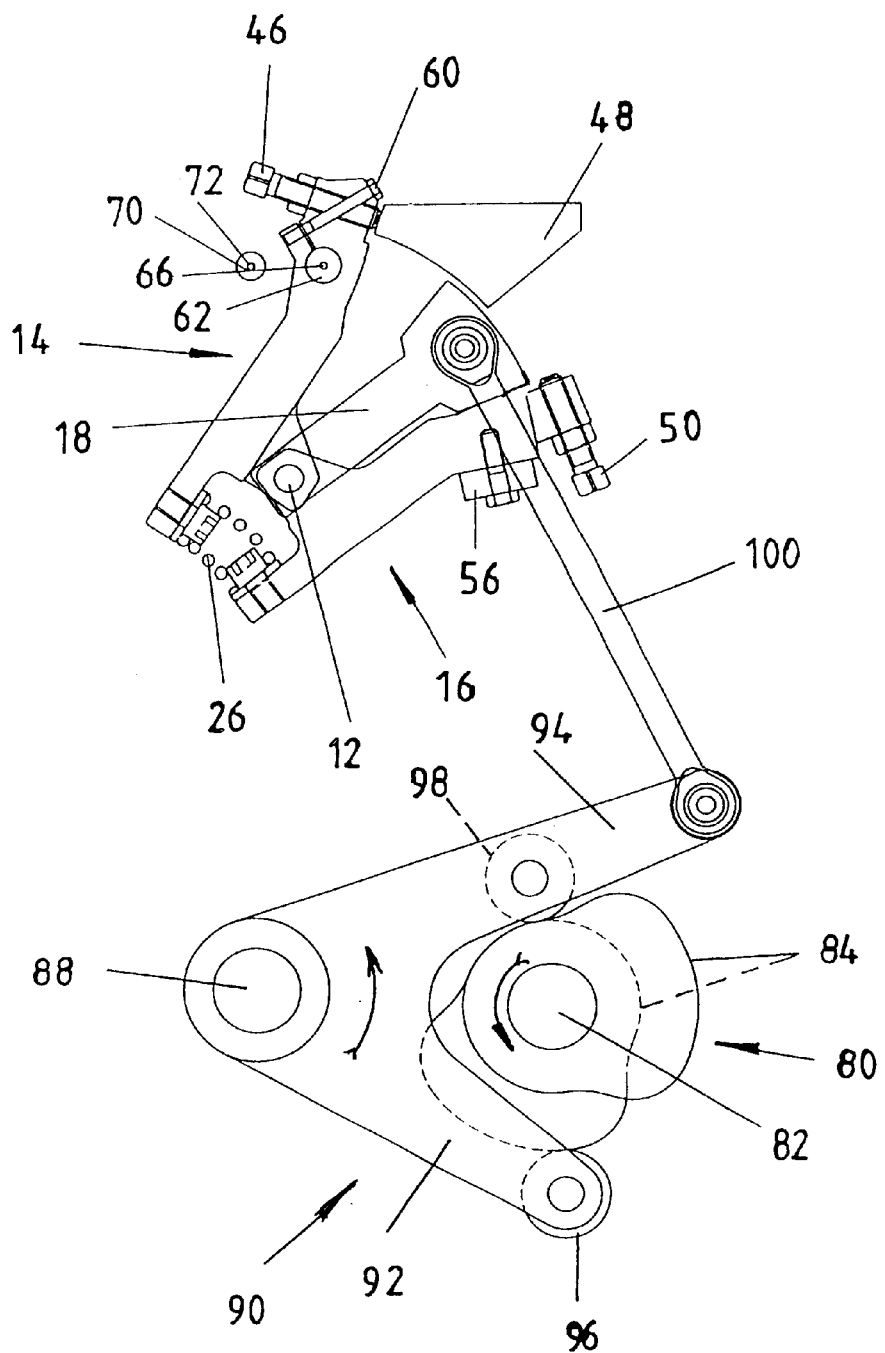
FIG. 5 shows the design of FIG. 1 with a hammer position as in FIG. 3, but with an alternative hammer drive system.

The alternate drive system for the striker 18 shown in. FIG. 5 makes use of a cam gear 80. For this purpose, a non-rotating twin cam plate 84 is installed on a driven shaft 82 of the forming press. A pivoting angled double roller lever 90 is supported in a pivot bearing 88 installed in the frame. Both arms 92 and 94 of this lever 90 each carry a roller 96 and 98, respectively, which contact the twin cam plate 84. The upper arm 94 of the double roller lever 90 actuates the striker 18 by means of a tie rod 100.

For actuating the striker 18, a camshaft or a servomotor, for example, may be used instead of the cam gear 80.

Figure 3:
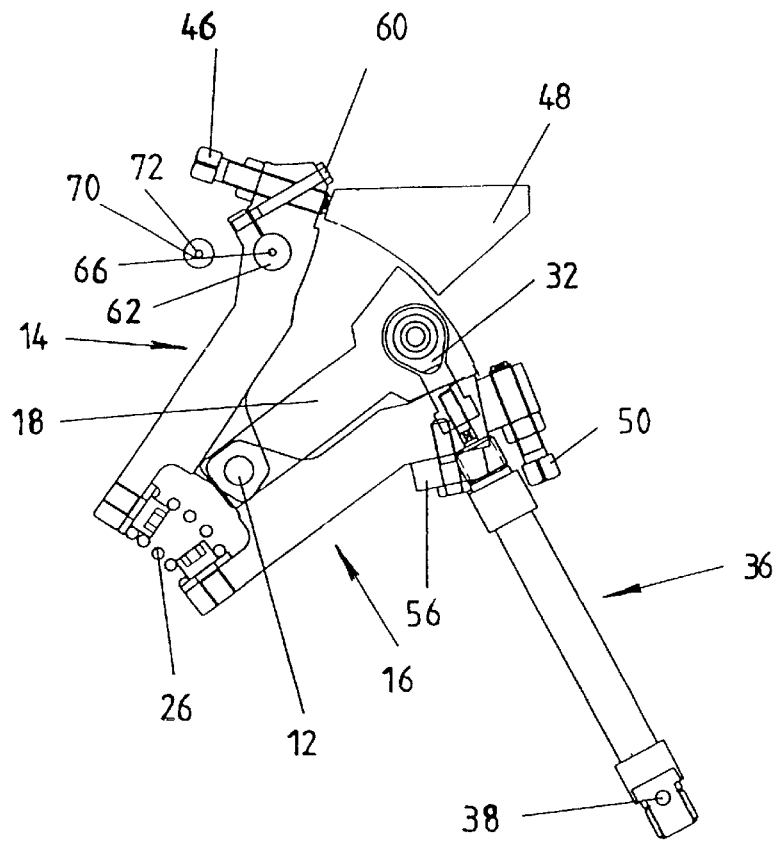
FIG. 3 shows the design of FIG. 1 with a hammer position just before the hammer is accelerated towards the cutting lever.

The operation of the high-speed impact cutter is as follows, starting with the condition shown in FIG. 1 where all three levers 14, 16, and 18 are in contact with each other:

While the wire 66 is still being fed forward through the cutting sleeves 68 and 62 that are lined up with each other, the striker 18 is removed from the cutting lever 14 by the cam gear 80, or by the action of the piston rod of the cylinder-and-piston assembly 36, pulling along the auxiliary lever 16 until the striker 18 and the auxiliary lever 16 reach the position shown in FIG. 3. This causes the spring 26 to be pretensioned even more, and it holds the cutting lever 14 in contact with the counter bearing 48.

Now, the striker 18 is accelerated back into its starting position shown in FIG. 1, either by the cam gear 80, or by applying a pressure medium to the piston of the cylinder-and-piston assembly 36. In the course of this process, the spring 26 holds the auxiliary lever 16 in contact with the striker 18. After completion of the feeding of the wire into the cutting sleeve 62, the accelerated striker 18, together with the auxiliary lever 16 and the supplementary mass 56 attached to the same, impacts on the cutting lever 14 at a certain speed. Now, the cutting lever 14 immediately rotates—to the left in FIG. 1—around the pin 12 with the same speed as the striker 18.

Via the striker 18, the kinetic energy stored in the moving auxiliary lever 16 is transferred to the cutting lever 14 in such manner that the auxiliary lever 16 stops immediately (physical law of the conservation of momentum). No other reaction force has been applied to the striker 18 but that which corresponds to the energy required for cutting the wire 66. This additional energy can be determined experimentally and be made available by means of the moving supplementary mass 56.

Figure 4:
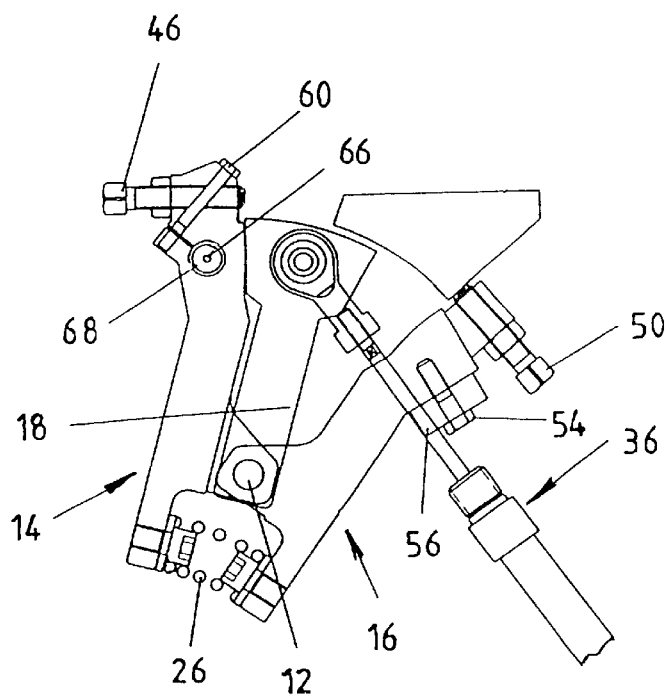
FIG. 4 shows the design of FIG. 1 in an idle position for ejecting the wire section from the cutting sleeve of the movable cutting lever.

FIG. 4 shows the striker 18 and the cutting lever 14 in a return idle position. While they remain in this position, the ejector ram 72 sliding in the ejection sleeve 70 ejects the wire section 76 of the endless wire supply 66 (that had been cut/sheared by the cutting sleeves 62 and 68) from the cutting sleeve 62 in conventional manner for further processing in the forming press. The return position of the cutting lever 14 for the ejection of the wire section 76 was reached by further actuation of the cylinder-and-piston assembly 36, or by means of the cam gear 80; in the course of this, the cutting lever 14 was moved away from the counter bearing 48 by the striker 18, against the force of the spring 26.

After the ejector ram 72 has been removed from the cutting sleeve 62 of the cutting lever 14, the striker 18, the cutting lever 14, and the auxiliary lever 16 are returned to the pivot position shown in FIG. 3 by an actuation of the piston rod of the cylinder-and-piston assembly 36, or by the cam gear 80, with the movements described above occurring in reverse: i.e., when the striker 18 impacts the immobile auxiliary lever 16, this auxiliary lever 16 picks up the momentum of the striker 18 and the cutting lever 14, and the striker 18 keeps moving along with the auxiliary lever 16 without delay.

As proposed by the invention, the arrangement of the striker 18 between the cutting lever 14 and a mass carrier, i.e. the auxiliary lever 16 (disregarding the supplementary mass 56 of this lever for the moment), can be compared to the familiar physical arrangement of three ideal spherical pendula in one plane, where two outer spheres of identical mass are each in contact with a center sphere of random mass. If the center and one outer sphere together are pulled away from the other outer sphere (by deflection of the pendulum), and are then released, the outer sphere trailing the center sphere stops when the center sphere impacts on the previously immobile outer sphere and pushes it along. Here, the theorem of the conservation of momentum and energy applies, if no other forces besides gravity are present. Specifically, this means that the center sphere transfers the momentum of the trailing outer sphere to the other outer sphere that is being pushed away while fully retaining its own momentum, so that there is no complete transfer of momentum as will happen in the same spherical pendulum arrangement if only the one outer sphere is pulled away from the center and other outer sphere, both of which remain at rest, and is then released.

The assembly 36, or the gear 80, is needed for driving the striker 18 in order to allow a machine-synchronous operation, and also for selecting the desired cutting speed. The mass of the striker 18 is not an essential feature.

The present invention may be further characterized by the following numbered paragraphs.

I.) Hammer (tool machine), specifically intended for impact cutters for cutting sections of wire and/or rods, with a striker that can be driven at impact speed, and a tool carrier on which the striker impacts, characterized by the features that on the back side of the striker (18), facing away from the tool carrier (cutting lever 14), a separate mass carrier (auxiliary lever 16) is located; this mass carrier stays in contact with the striker (18) while following its movement towards the tool carrier (14), until the striker (18) strikes the tool carrier (14)—which interrupts the action of its drive system—and stops at the same time; by means of the striker (18) that is being moved back to its starting position, said mass carrier (16) is taken along back to its own starting position, starting at that moment when the striker (18), its drive system resuming operation again, strikes the mass carrier (16), and the tool carrier (14) that has been moved back to its starting position stops at the same time; and that the moving mass of the mass carrier (16) is larger by the amount $2A/v^2$ than the moving mass of the tool carrier (14), where A is the cutting work and v the operating speed to be provided by the tool carrier (14).

II.) Hammer as in Paragraph I, whose driven tool carrier can be moved back to its starting position by means of a return spring, characterized by the features that the tool carrier and the mass carrier are designed as two-armed levers (14 and 16, respectively) with a common pivot point (pin 12) on which the striker (18) pivots between the two levers (14 and 16); that the two longer arms of the levers carry the tool (cutting sleeve 62) and an exchangeable supplementary mass (56), respectively, and that the return spring (compression spring 26) is installed between the two shorter arms of the levers; and that they are each equipped with a stop (setscrew 46 and 50, respectively) which acts in conjunction with a fixed counterstop (counter bearing 48) that is located in the pivoting sector of the striker (18).

III.) Hammer as in Paragraphs I or II, characterized by the feature that the striker (18) can be driven by means of a push and pull rod (34; 100) linked to it by means of a pivot joint.

IV.) Hammer as in Paragraph 3, characterized by the feature that the push and pull rod is the piston rod (34) of a cylinder-and-piston assembly (36).

V.) Hammer as in Paragraph III, with a contacting cam gear (80) whose two rollers (96 and 98) are attached to an angled lever (90), characterized by the feature that the push and pull rod (100) is linked to one (94) of the two arms (92 and 94) of the lever.

VI.) Use of the hammer as in one of Paragraphs I–V with impact cutters having one movable (62) and one fixed (68) cutting sleeve, characterized by the feature that the tool carrier (cutting lever 14) accepts the movable cutting sleeve (62) and can be moved between a starting position in which the two cutting sleeves (62 and 68) line up along the material (wire 66) to be cut, and an end position in which the movable cutting sleeve (62) in alignment with the cut section of material (wire section 76) lines up with a fixed ejection sleeve (70) guiding an ejection ram (72).

What is claimed is:

1. A tool for cutting a wire or rod workpiece comprising:
 a striker that can be driven at a selected speed along a path from the first position to a second position to cut the workpiece;

a mass carrier positioned on a first side of the striker and movable with the striker along a first portion of the path;

a tool carrier positioned on a second, opposite side of the striker and movable with the striker along a second portion of the path;

wherein the mass of the mass carrier has been selected to be greater than the mass of the tool carrier by an amount which, when moved at a selected speed along the first portion of the path of the striker, has a kinetic energy equal to the energy required to cut the workpiece;

the striker and mass carrier together move along the first portion of the path while the tool carrier is stationary until the striker hits the tool carrier; and the movement of the mass carrier is stopped by transferring its kinetic energy to the tool carrier whereupon the tool carrier is driven to cut the work piece.

2. The tool of claim 1, wherein the striker, mass carrier, and tool carrier are each pivotable about a common axis.

3. The tool of claim 2, wherein the mass carrier and tool carrier respectively include levers rotatable about the common axis, each lever has a longer arm and a shorter arm, the longer arm of the tool carrier being configured to carry a cutting tool, and the longer arm of the mass carrier being configured to carry an exchangeable supplementary mass.

4. The tool of claim 3, further comprising a return spring is interposed between the shorter arms to bias them toward opposite sides of the striker.

5. The tool of claim 4, wherein the levers are each provided with an adjustable stop that interacts with a fixed counterstop to selectively determine stop points for for the mass carrier and tool carrier.

6. The tool of claim 5, comprising a connecting rod pivotably connected to the striker whereby the striker can be drivingly connected to a push and pull device.

7. The tool of claim 6, wherein the push and pull device includes a piston and cylinder assembly.

8. The tool of claim 6, wherein the push and pull device includes a cam and a cam follower, and the cam follower is linked to the connecting rod.

9. The tool of claim 3, comprising the cutting tool which includes a fixed cutting sleeve and a movable cutting sleeve attached to the tool carrier, and wherein at one end of the second portion of the path the movable cutting sleeve is aligned with the fixed cutting sleeve, and at an opposite end of the second portion of the path the movable cutting sleeve is aligned with a fixed ejection sleeve that in turn in aligned with a movable ran for ejecting a cut workpiece.

10. The tool of claim 1, wherein the mass carrier and tool carrier respectively include levers rotatable about a common axis, each lever has a longer arm and a shorter arm, the longer arm of the tool carrier being configured to carry a cutting tool, and the longer arm of the mass carrier being configured to carry an exchangeable supplementary mass.

11. The tool of claim 10, further comprising a return spring is interposed between the shorter arms to bias them toward opposite sides of the striker.

12. The tool of claim 10, wherein the levers are each provided with an adjustable stop that interacts with a fixed counterstop to selectively determine stop points for for the mass carrier and tool carrier.

13. The tool of claim 11, comprising a connecting rod pivotably connected to the striker whereby the striker can be drivingly connected to a push and pull device.

14. The tool of claim 1, comprising a connecting rod pivotably connected to the striker whereby the striker can be drivingly connected to a push and pull device.

15. The tool of claim 14, wherein the push and pull device includes a piston and cylinder assembly.

16. The tool of claim 14, wherein the push and pull device includes a cam and a cam follower, and the cam follower is linked to the connecting rod.

17. The tool of claim 1, comprising the cutting tool which includes a fixed cutting sleeve and a movable cutting sleeve attached to the tool carrier, and wherein at one end of the second portion of the path the movable cutting sleeve is aligned with the fixed cutting sleeve, and at an opposite end of the second portion of the path the movable cutting sleeve is aligned with a fixed ejection sleeve that in turn in aligned with a movable ran for ejecting a cut workpiece.

* * * * *